Feb. 23, 1954 W. A. HASBANY 2,670,064
PARKING LOCKUP FOR TRANSMISSIONS
Filed Dec. 6, 1949 2 Sheets-Sheet 1

INVENTOR.
Woodrow A. Hasbany
BY Brown, Jackson, Boettcher & Dienner
ATTORNEYS

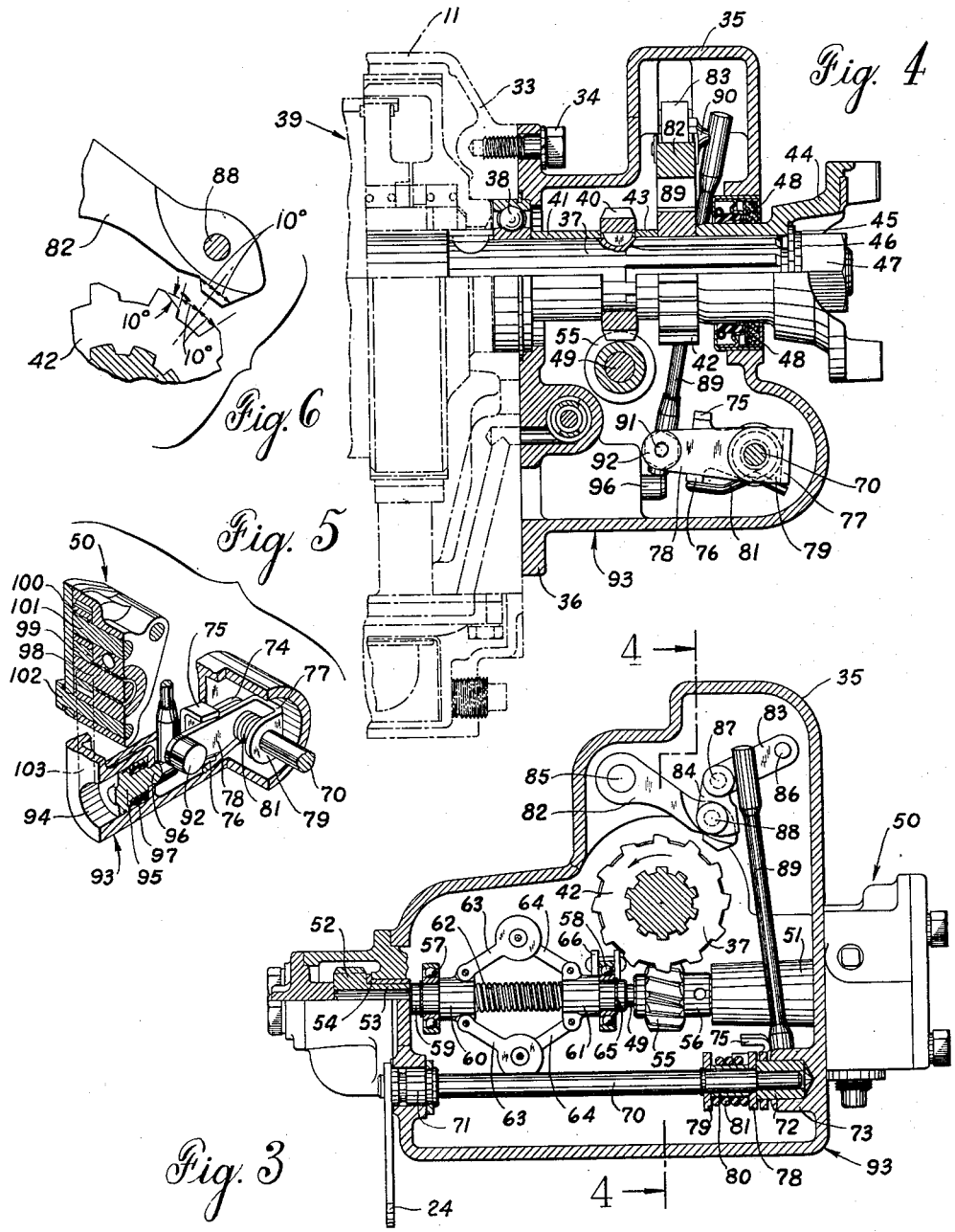

Patented Feb. 23, 1954

2,670,064

UNITED STATES PATENT OFFICE 2,670,064

PARKING LOCKUP FOR TRANSMISSIONS

Woodrow A. Hasbany, South Bend, Ind., assignor to The Studebaker Corporation, South Bend, Ind., a corporation of Delaware Application December 6, 1949, Serial No. 131,411

19 Claims. (Cl. 192—4)

My invention relates generally to transmissions and is directed more particularly to a parking lockup for transmissions.

It is the universal practice in the automotive field to provide a commercial vehicle, as for example, an automobile with a parking brake which is adapted to be actuated by a hand lever in the driver's compartment for keeping the vehicle stationary, as is particularly desirable when the driver wishes to park the vehicle. A parking brake of a character to which I make reference, is adapted to act in conjunction with either the wheels or the transmission of the vehicle. In the former type of parking brake, cables are provided between the hand lever in the driver's compartment and the brake shoes associated with the brake drums of the vehicle wheels. By manipulation of the hand lever the brake shoes are forced into frictional engagement with the brake drums for holding them against rotation. The second type of parking brake referred to is associated with the transmission output shaft adjacent the rear of the transmission housing, and comprises either a brake drum and band assembly or a disc brake assembly, both of a known and conventional construction. The mechanism for operating this latter type of brake usually comprises a linkage system provided between the hand lever and the brake band or brake disc, as the case may be. By manipulation of the hand lever, the brake band or brake disc is forced into frictional engagement with the brake drum or brake plate respectively for holding the transmission output shaft against rotation.

There are several disadvantages in utilizing parking brake constructions of the character described. First and foremost, these brakes are not positive in their braking action because their holding power is dependent on friction alone. Furthermore, the brake facing material used in the above described brakes is susceptible to wear, thus requiring frequent compensating adjustments to be made on the brake mechanism and periodical re-lining of the brake facing material. It will also be realized that if oil becomes deposited on the brake facing material, the effective braking power of the parking brake is decreased. It is also a difficult matter for a driver when applying a brake of the character described, to ascertain whether he has manipulated the hand lever a sufficient degree to hold the automobile stationary, while if after having once applied the brake the driver neglects to release it while driving the vehicle, he furthers undue wear of the brake facing material.

It is an object of my present invention to provide a positive parking lockup adapted for association with the output shaft of a transmission for holding it against rotation.

I propose to accomplish the aforementioned object by fixedly mounting a ratchet or toothed wheel to the output shaft of the transmission adjacent the rear end thereof, and providing a manually selectively operable pawl for engagement therewith to hold the ratchet or toothed wheel against rotation, thereby providing a positive parking lockup. This construction provides positive locking with negligible wear of the parts, is unaffected by oil, requires substantially no adjusting and must be released before the transmission is put into a drive condition.

A further object of my invention is to provide a parking brake lockup for a vehicle including a manually operable brake lever for applying brake means for braking the output shaft of a transmission, and together with means for preventing movement of the brake lever to a position for applying the brake means above a predetermined speed of the vehicle.

In the preferred form of my invention I accomplish the last noted object by providing a safety interlock mechanism for the aforementioned pawl which will prevent engagement of the pawl with the ratchet wheel until the speed of the output shaft has decreased to a safe minimum to prevent undue clashing of the pawl with the teeth of the ratchet wheel.

In the preferred embodiment of my invention, the safety interlock mechanism is responsive to the fluid pressure of a hydraulic pump, which pump is geared to the output shaft of the transmission. When the output shaft of the transmission is rotating, pressure is built up in the hydraulic pump, which prevents the interlock mechanism from releasing the pawl. When the speed of rotation of the transmission output shaft decreases to a predetermined point, the pump pressure becomes negligible, permitting the interlock mechanism to release the pawl. Thus, it will be understood that engagement between the pawl and ratchet wheel cannot take place until the speed of the output shaft decreases to a safe value, which thus prevents undue clashing of the pawl with the teeth of the ratchet wheel.

The parking lockup of my present invention is particularly adapted for use with an automatic transmission for a commercial vehicle embodying hydraulic pump means in the operation thereof which may be tapped so as also to effect operation of the aforedescribed safety interlock mechanism. When the parking lockup is used in conjunction with an automatic transmission, the pawl is selectively operated by the shift lever mounted adjacently below the steering wheel, which shift lever is provided for manually controlling the operation of the transmission. The linkage mechanism between the pawl and shift lever is connected in a manner that retraction of the pawl from the ratchet wheel is effected before the transmission is placed in a driving condition, thereby preventing shearing of the pawl or teeth of the ratchet wheel, and allowing the vehicle to move.

It should further be noted that the safety interlock mechanism prevents the engagement of the pawl with the ratchet wheel when the shift lever on the steering wheel is thrown into the park position from a driving position before the vehicle speed has decreased to a predetermined speed, thus preventing any chance of a sudden engagement of the pawl with the ratchet which would result in an instantaneous braking of the vehicle, causing in some cases, severe injuries to the passengers in the vehicle due to their momentum. Also, in some cases, skidding of the car may be initiated resulting in a crash, causing damage to the vehicle, property and passengers.

Now, in order to acquaint those skilled in the art with the manner of constructing and utilizing devices in accordance with the principles of my present invention, I shall describe in connection with the accompanying drawings a preferred embodiment of my present invention.

In the drawings:

Figure 3 is a vertical sectional view of the parking lockup of my present invention taken substantially along the line 3—3 in Figure 1 looking in the direction indicated by the arrows;

Figure 4 is a vertical sectional view of the parking lockup shown in Figure 3 and is taken substantially along the line 4—4 in Figure 3 looking in the direction indicated by the arrows, certain parts being shown in elevation;

Figure 5 is a perspective view, certain parts being shown in section and certain other parts being shown in elevation, of the safety release mechanism and a hydraulic pump associated therewith provided for the parking lockup of my invention; and Figure 6 is an enlarged fragmentary view of the ratchet and pawl of my present invention, with the pawl in disengaged position.

Figures 1, 2:
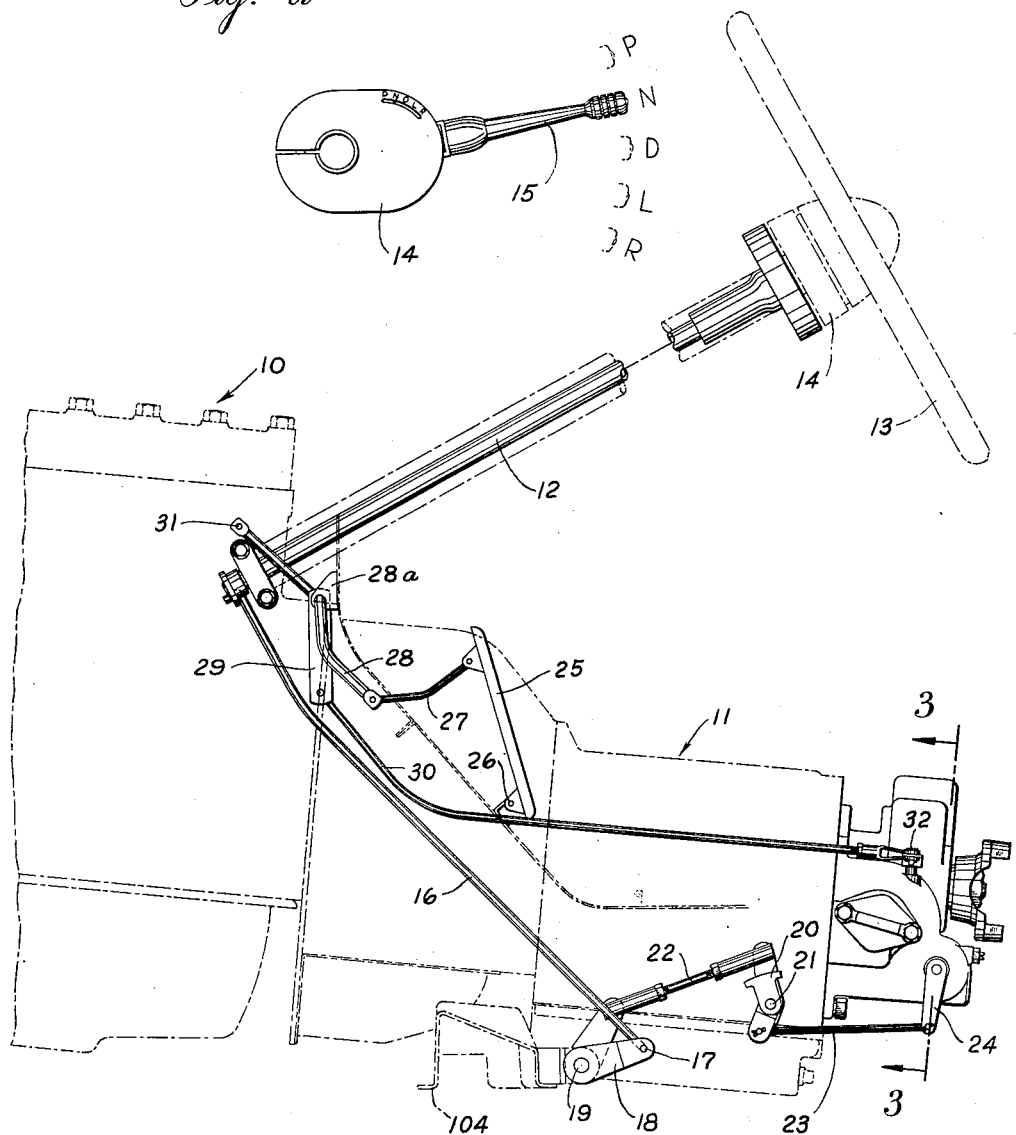
Figure 1 is a general diagrammatic view of the linkage system between the parking lockup of my present invention, adjacent the rear end of the transmission, and the shift lever mounted on the steering column, adjacently below the steering wheel.
Figure 2 is substantially an elevational view of a shift lever having several graduated operating positions for use with a hydraulic transmission.

Referring now to Figures 1 and 2, there is shown generally diagrammatically a prime mover 10 and associated transmission means 11 for a commercial vehicle, as for example an automobile, together with a steering column 12 having a hand steering wheel 13 disposed adjacent the upper end thereof. The transmission means 11 comprises a hydraulic transmission in the particular embodiment illustrated herein. It will, however, be understood that the device of my present invention may be incorporated with transmissions of conventional gear design. Mounted on the steering column 12 immediately below the hand steering wheel 13 is a hollow box-like bracket member 14, in which one end of a transmission shift lever 15 is pivotally mounted. The shift lever 15 is adapted to be placed in one of a plurality of conditioning positions for the transmission 11. In the specific embodiment illustrated in the present application, the conditioning positions number five and comprise a reverse, forward low drive, forward high drive, neutral, and park position.

Suitable known means is provided between the pivoted end of the shift lever 15 adjacent the upper end of the steering column 12 and the one end of a link 16, adjacent the lower end of the steering column 12, for shifting link 16 lengthwise responsive to adjustment of the shift lever 15. The link 16 adjacent its other end is pivotally secured at 17 to the outer end of one arm of a first bell crank 18 which is pivotally secured at 19 to the vehicle frame cross member 104. A second bell crank 20 is pivotally secured at 21 to the housing of the transmission means 11, spaced a short distance lengthwise therealong from the first bell crank 18. Interconnecting the outer end of one arm of the second bell crank 20 to the outer end of the other arm of the first bell crank 18 is a link 22 which may be adjusted to vary its lengthwise extent. The outer end of the other arm of the second bell crank 20 is interconnected by means of a link 23 to the outer end of a crank arm 24 which is operably connected to the parking lockup device of my present invention in a manner to be fully disclosed hereinafter.

An accelerator pedal is provided at 25 and is pivotally mounted at its one end at 26 in a known manner to a portion of the vehicle frame. The other end of the accelerator pedal 25 is pivotally secured to one end of a Z-shaped member 28, rockably mounted in a bracket 28a carried by a portion of the vehicle frame. The other end of the Z-shaped member 28 is suitably connected at 31, in a known manner, to the throttle of the prime mover 10, for varying the output speed thereof. A crank arm 29 is fixedly secured at its one end to the intermediate portion of the member 28 and at its other end is pivotally secured to one end of a link 30 for effecting substantially lengthwise movement thereof. The link 30 at its other end is connected at 32 to the rear end of transmission 11 and is provided for effecting a shift from one gear ratio to another gear ratio when the accelerator pedal 25 is fully depressed and the transmission is in a forward drive condition. Since the latter linkage system forms no part of my present invention, it is believed that a further description herein will be unnecessary.

Figures 3 through 6 show the details of the lockup device of my present invention. There is mounted to the rear end of the transmission housing 33 of the transmission means 11 an extension housing 35, which is secured thereto in the particular embodiment illustrated, by means of a plurality of bolts 34 disposed through circumferentially spaced openings in the annular flange 36 of the extension housing 35 and threaded into engagement with circumferentially spaced threaded openings formed in the rear end wall of the transmission housing 33. Disposed lengthwise in the transmission housing 33 and extending through the extension housing 35 is an output shaft 37, which is suitably journalled by means of a ball bearing assembly 38, in the rear end wall of the transmission housing 33. There is secured to that portion of the output shaft 37, lying within the transmission housing 33, a plurality of gear means indicated generally at 39 which are provided for effecting various speed ratios and forward and reverse drive between the prime mover 10 and the output shaft 37. The gear means 39 form no part of my present invention and since they are of conventional and known construction, it is believed that a complete showing and description thereof is not necessary.

Keyed to the output shaft 37 within the extension housing 35 is a gear 40 provided for a purpose to be fully described hereinafter. The gear 40 is spaced axially from the ball bearing assembly 38 by means of a collar member 41 disposed about the output shaft 37. The rear end of the output shaft 37 is externally splined in a conventional manner and a ratchet wheel 42 having an internally splined opening which is adapted to mate with the splined end of the output shaft 37 is disposed thereon closely adjacent the gear 40. The ratchet wheel 42 is spaced axially from the gear 40 by means of a collar member 43 concentrically located about the output shaft 37. Carried on the splined end of the output shaft 37 is the internally splined reduced end portion of a jaw member 44 which is one part of a conventional universal joint. The jaw member 44 abuts against one side of the ratchet wheel 42, and is held on the output shaft 37 by means of a washer 45 which engages a peripheral shoulder formed internally of the intermediate portion of the member 44. The washer 45 in turn, is secured to the shaft 37 by means of a lock washer 46 and a nut 47 which is threaded on the threaded reduced end portion of the output shaft 37. Provided between the reduced end portion of jaw member 44 and the inner peripheral edge of the opening formed in the rear end wall of the extension housing 35, through which the output shaft 37 extends, is an oil seal 48 of conventional design for keeping oil within the housing 35 and keeping dirt from entering the housing 35.

Extending transversely of the output shaft 37 immediately therebelow is a shaft 49 which is used, among other things, to drive a hydraulic pump, indicated generally at 50, suitably mounted to the side wall of the extension housing 35. The pump 50 is of conventional construction and is adapted to develop fluid pressure, primarily for connecting output shaft 37 to vehicle prime mover 10 when the prime mover cannot be started in the normal manner but must be pushed by another vehicle. A further use of the pump 50 will be disclosed hereinafter. The shaft 49 at its one end is journalled within an extending sleeve member 51 and is operably connected in a suitable manner to the pump 50. The shaft 49 at its other end has mounted thereon a gear 52 having a hub portion 53 which is journalled in a bushing member 54 disposed in the side wall of extension housing 35. Secured to the shaft 49 adjacent the sleeve 51 is a pinion 55 having a hub portion 56. The pinion 55 is adapted to have meshing engagement with the aforedescribed gear 40 carried on the output shaft 37. Thus rotation of the output shaft 37 and gear 40 effects rotation of the pinion 55 and shaft 49 for driving the hydraulic pump 50.

Carried on the shaft 49 between one end thereof and the pinion 55 is a governor mechanism comprising a pair of axially spaced apart collar members 60 and 61, which are maintained in spaced relation by means of a coil spring 62. Pivotally secured at their one ends to ears on the collar members 60 are a plurality of links 63 which have formed integrally at their other ends enlarged weighted end portions. A plurality of links 64 are pivotally secured at their one ends to ears on the collar member 61 and at their other ends to the enlarged weighted end portions of one each of the links 63. A ball bearing assembly 57 is disposed in juxtaposition of the collar member 60 and is held against axial movement to the left, as viewed in Figure 3, by means of a retainer ring 59 carried in a groove formed in the shaft 49. A second ball bearing assembly 58 is mounted on the reduced end portion of the collar member 61 and is held thereon by means of a retaining ring 65, like ring 59. A shift lever indicated at 66 is secured to the outer race of the ball bearing assembly 58. The governor mechanism is adapted to cooperate with the accelerator pedal 25 and the linkage mechanism associated therewith and, as has been previously mentioned, this mechanism forms no part of the present invention, so a further showing and description is deemed unnecessary.

Disposed in extension housing 35, parallel to shaft 49, is a shaft 70 having a bushing member 71 suitably secured thereon, as by a press fit, which member 71 is journalled in an opening formed in one side wall of housing 35. The other end of shaft 70 is provided with a bushing member 72 fixed thereon and which is journalled in an opening in an inwardly extending boss 73 formed at the opposite side wall of housing 35. The aforedescribed crank arm 24 is fixedly secured to the one end of shaft 70 outwardly of the one side wall of extension housing 35 in a manner to effect limited rotation of the shaft 70 in response to movement of the shift lever 15 adjacent the hand steering wheel 13. Secured to one end of the bushing member 72, adjacent the boss 73, is an arm member 74 having a pair of spaced apart laterally projecting lug portions 75 and 76 formed at the upper and lower edges thereof, respectively. Journalled on shaft 70, adjacent the arm member 74, is a U-shaped member 77 having a long leg 78 and a short leg 79. A sleeve member 80 is provided between the legs 78 and 79 to increase the bearing area between the U-shaped member 77 and the shaft 70. The long leg 78 of the U-shaped member 77 is disposed within the confines of lugs 75 and 76 of the arm member 74 and is adapted for relative movement therebetween. Disposed about the sleeve member 80 is a torsion spring 81, one end of which engages the lower portion of lug 76 and the other end of which engages the bight portion of the U-shaped member 77. Torsion spring 81 urges member 77 counterclockwise, as viewed in Figure 4, so as to bring the lower edge of leg 78 of member 77 into contact with lug 76 of member 74, as shown.

Pivotally mounted at its one end about a fixed axis 85, as to extension housing 35, at a point above a horizontal plane passing through the axis of the output shaft 37, is a pawl 82, which has a tooth formed at its outer end adapted to engage one of the spaces between the teeth on the ratchet wheel 42 at a point above the aforedescribed horizontal plane so as to hold the ratchet wheel 42 against rotation. An enlarged fragmentary view of the ratchet wheel 42 and pawl 82 is shown in Figure 6. The upper edge of each tooth of the ratchet wheel 42 is formed substantially the entire width thereof at an angle of less than 12° with respect to a plane extending transversely of a radial line passing through the center of the tooth. By forming the edges of the teeth of the ratchet wheel 42 at an angle of less than 12° easy ratcheting of the tooth of pawl 82 over the teeth of the ratchet wheel is permitted when the vehicle is in reverse motion, thereby reducing noise and wear between the teeth of the pawl 82 and ratchet wheel 42 to a minimum. The sides of the teeth on the ratchet wheel 42 are formed at an angle of less than 12° and the tooth on the pawl 82 is formed in a like manner. With this construction, the pawl 82 and the ratchet wheel 42 carry the entire load. That is, no load is transferred to the other links of the actuating mechanism. Thus the links 83 and 84 are not structural members as they would have to be if the teeth on the ratchet wheel 42 and pawl 82 were formed say, for example, at an angle of 30° instead of 10°. The links 83 and 84 are employed only for effecting engagement of the pawl 82 with the ratchet wheel 42. The angle of the teeth is particularly important in the preferred form of my invention, and it has been found that an angle of less than 12° will permit the pawl 42 to be released easily when under load and yet will not allow the pawl 82 to be thrust out of engagement with the ratchet wheel 42 when under load. Another feature of this particular tooth form is that it permits the use of a minimum number and size of links and requires only a minimum force to disengage the pawl 82 when under load, since the junction of the links 83 and 84 does not go past a plane extending through the other ends of the links 83 and 84 which is a positive locking position. Pivotally mounted at its one end about a fixed axis 86, as to extension housing 35, at a point above a horizontal plane passing through the axis of the output shaft 37, spaced from the pivotal mounting 85 of the pawl 82, is a crank arm 83. A stub link member 84 is pivotally secured adjacent its one end at 87 to the outer end of crank arm 83 and adjacent its other end at 88 within a recessed portion of the outer end of pawl 82. A generally vertically extending rod-like link member 89 is connected adjacent its upper end, by means of a ball and socket connection 90, to the crank arm 83 intermediate of the ends thereof. The link 89 adjacent its lower end, is pivotally secured, as at 91, to the outer end of the leg 78 of the U-shaped member 77. The link 89 and leg 78 are maintained in assembled relation in a suitable manner as by means of a nut 92 threaded on the end of a screw carried by the link 89.

Referring again to Figure 2, it will be seen that the transmission shift lever 15 may be disposed in one of 5 conditioning positions for the transmission 11. The lever 15, as shown, is in the neutral position during which the transmission input shaft is disconnected from the output shaft. Thus, no drive is effected to the wheels of the vehicle. When the lever 15 is placed in the park position, shaft 70, shown in Figure 3, is rotated through the linkage provided between the shift lever 15 and the crank arm 24 mounted on the end of shaft 70. Rotation of shaft 70 causes the arm member 74 to rotate counterclockwise, as viewed in Figure 4, causing the lug 75 to engage the upper edge of the leg 78 of the U-shaped member 77, forcing it downward against the force exerted by the torsion spring 81. This, in turn, pulls rod 89 downward moving the pawl 82 into engagement with the ratchet wheel 42 for holding it against rotation. By this means, the drive wheels of the vehicle are positively held against rotation. The arrangement of the arm 74 and member 77 provides a lost motion connection which allows lever 15 to complete its travel into the park position when the tooth on the pawl does not happen to index with the corresponding space on the ratchet wheel 42 and torsion spring 81 preloads the pawl 82 so that it will be urged into position when ratchet wheel 42 starts to move. When the lever 15 is placed successively in neutral, forward drive, forward low, or reverse, shaft 70 is rotated simultaneously causing successive upward increments of movement of the rod 89, which, in turn, effects upward movement of the pawl 82 away from and out of engagement with the ratchet wheel. The pawl 82 is completely disengaged from the ratchet wheel 42 when movement of shift lever 15 from the park to the neutral position is completed.

Mounted adjacent the lower portion of the extension housing 35 is the safety lock mechanism of my present invention, indicated generally at 93. As best shown in Figure 5, the safety lock mechanism 93 comprises a horizontally extending cylinder 94 in which a piston 95 is disposed for lengthwise movement therein. The piston 95 has a reduced end portion 96 which is adapted to extend through an opening formed in the end wall of the cylinder 94. The piston 95 is normally biased inwardly by means of a coil spring 97 concentrically located on the reduced end portion 96 between the inner surface of the end wall of the end wall of the cylinder 94 and the head portion of the piston 95. The open end of cylinder 94 is suitably connected, as by a conduit 103 shown in dotted lines to the high pressure side of the aforementioned hydraulic pump 50 which, as shown in Figure 5, is along the lines of a conventional gear pump and generally comprises a main shaft 98 driven by shaft 49. A gear 99 is mounted at one end of shaft 98 and is adapted to have meshing engagement with a second gear 100 carried on an idler shaft 101. The pump 50 is held in assembled relation by means of a bolt 102. The construction of the hydraulic pump 50 forms no part of the present invention and it is believed that the general description presented above will be adequate for purposes of the present disclosure.

The piston or plunger 95 is responsive to the fluid pressure maintained on the output or high pressure side of the pump 50 and this pump serves as a governor means which controls the positioning of the piston 95 in response to the speed of rotation of the transmission output shaft 37. That is, when the vehicle is moving the transmission output shaft 37 is rotating effecting rotation of shaft 49 and thus driving the pump 50, which causes fluid pressure to be built up in the cylinder 94 forcing the piston 95 outwardly. When the vehicle slows down to about 2 to 3 miles per hour, the speed of the output shaft 37, shaft 49 and pump 50 is decreased, thus reducing the fluid pressure in the cylinder 94, allowing the spring 97 to move the plunger 95 inwardly.

The aforedescribed safety lock mechanism 93 operates in the following manner: When the speed of the output shaft 37 exceeds a predetermined maximum the fluid pressure developed by the pump is sufficient to overcome the biasing force of the spring 97 and the piston 95 is forced outward and maintained in this position until the fluid pressure decreases in response to a decrease in the speed of the output shaft 37. When the piston 95 is forced outward the reduced end portion 96 is disposed below and adjacent to the lower end of the rod 89. When the piston is in this position the rod 89 is held against further downward movement preventing the engagement of the pawl 82 with the ratchet wheel 42 but allows the placing of the shift lever 15 in the park position. It will thus be seen that when the vehicle speed is above a predetermined minimum (vehicle speed being a function of the speed of the transmission output shaft) it is impossible for an operator of the vehicle to effect the engagement of the pawl 82 with the ratchet wheel 42 even though the operator has placed lever 15 in the park position from a driving position, thus preventing any chance of a sudden engagement of the pawl 82 with the ratchet wheel 42 resulting in an undesirable instantaneous braking.

When the vehicle speed decreases below the predetermined minimum spring 97 forces the plunger 95 inwardly out of engagement with the lower end of rod 89, thus permitting the pawl 82 to engage the ratchet wheel 42 for braking the latter.

While I have shown and described what I believe to be a preferred embodiment of my present invention, various rearrangements and modifications may be made therein without departing from the spirit and scope of my invention.

I claim:

1. In a transmission having an output shaft, the combination of lockup means for said output shaft for selectively braking the latter against rotation in either direction comprising, a ratchet wheel keyed to said output shaft, a pawl adapted to engage said ratchet wheel for holding the latter against rotation in either direction, and governor means associated with and responsive to the speed of rotation of said output shaft for preventing said pawl from engaging said ratchet wheel when said output shaft is rotating at a speed above a predetermined minimum.

2. In a transmission having an output shaft, the combination of lockup means for said output shaft for selectively braking the latter against rotation in either direction comprising, a ratchet wheel keyed to said output shaft, a pawl adapted to engage said ratchet wheel for holding the latter against rotation in either direction, manually operable means connected to said pawl for effecting engagement of the latter with said ratchet wheel, governor means associated with and responsive to the speed of rotation of said output shaft, a movable member associated with said governor means adapted to be disposed by the latter to engage with said last named means for preventing said pawl from engaging said ratchet wheel when said output shaft is rotating at a speed above a predetermined minimum.

3. In a transmission having an output shaft and a hydraulic pump driven by said output shaft, the combination of lockup means for said output shaft for selectively braking the latter comprising, a ratchet wheel keyed to said output shaft, a pawl adapted to engage said ratchet wheel for holding the latter against rotation, manually operable means connected to said pawl for effecting engagement of the latter with said ratchet wheel, and fluid pressure responsive means operably connected to said hydraulic pump and cooperating with said last named means for preventing said pawl from engaging said ratchet wheel when the fluid pressure developed by said hydraulic pump is above a predetermined minimum pressure corresponding to a predetermined minimum speed of the output shaft.

4. In a vehicle having a transmission with an output shaft, a steering post, and a manually operable transmission shift lever mounted thereon which is adapted to be selectively positioned in one of a plurality of conditioning positions, including a park position, for said transmission, the combination of lockup means for said output shaft for selectively braking the latter comprising, a ratchet wheel keyed to said output shaft, a pawl adapted to engage said ratchet wheel for holding the latter against rotation, means interconnecting said transmission shift lever and said pawl, and means cooperating with said last named means for allowing said shift lever to be placed in said park position when said vehicle is above a predetermined minimum speed while preventing engagement of said pawl with said ratchet wheel.

5. In a vehicle having a transmission with an output shaft, a hydraulic pump driven therefrom, a steering post, and a manually operable transmission shift lever mounted thereon which is adapted to be selectively positioned in one of a plurality of conditioning positions, including a park position, for said transmission, the combination of lockup means for said output shaft for selectively braking the latter comprising, a ratchet wheel keyed to said output shaft, a pawl adapted to engage said ratchet wheel for holding the latter against rotation, means interconnecting said transmission shift lever and said pawl, and fluid pressure responsive means operably connected to said hydraulic pump and cooperating with said linkage system for allowing said shift lever to be placed in said park position when the fluid pressure developed by said hydraulic pump is above a predetermined minimum pressure corresponding to a predetermined minimum speed of the output shaft while preventing engagement of said pawl with said ratchet wheel.

6. In a transmission housing having an output shaft disposed lengthwise therein, the combination of lockup means for said output shaft for selectively braking the latter comprising, a ratchet wheel keyed to said output shaft, a pawl pivoted adjacent its one end to said transmission housing and at its other end being adapted to engage said ratchet wheel for holding the latter against rotation, a link member cooperating at its one end with said pawl for effecting engagement of the latter with said ratchet wheel, and means cooperating with the other end of said link member for preventing the latter from effecting engagement of said pawl with said ratchet wheel when said output shaft is rotating at a speed above a predetermined minimum.

7. In a transmission housing having an output shaft disposed lengthwise therein, the combination of lockup means for said output shaft for selectively braking the latter comprising, a ratchet wheel keyed to said output shaft, a pawl pivoted adjacent its one end to said transmission housing, and at its other end being adapted to engage said ratchet wheel, for holding the latter against rotation, a generally vertically extending link member cooperating at its one end with said pawl for effecting engagement of the latter with said ratchet wheel, a plunger member cooperating with the other end of said link member, said plunger member being normally spring biased away from said link member to permit the latter to effect engagement of said pawl with said ratchet wheel, and means for overcoming said biasing force of said spring associated with said plunger member whereby said plunger member is disposed adjacent to and immediately below said link member for preventing the latter from effecting engagement of said pawl with said ratchet wheel when said output shaft is rotated at a speed above a predetermined minimum.

8. In a transmission housing having an output shaft disposed lengthwise therein and a hydraulic pump driven by said output shaft, the combination of lockup means for said output shaft for selectively braking the latter comprising, a ratchet wheel keyed to said output shaft, a pawl pivoted adjacent its one end to said transmission housing and at its other end being adapted to engage said ratchet wheel for holding the latter against rotation, a generally vertically extending link member cooperating at its one end with said pawl for effecting engagement of the latter with said ratchet wheel, a plunger member cooperating with the other end of said link member, said plunger member being normally spring biased away from said link member to permit the latter to effect engagement of said pawl with said ratchet wheel, fluid from said hydraulic pump having connection to said plunger for overcoming said biasing force of said spring associated with said plunger member whereby said plunger member is disposed adjacent to and immediately below said link member for preventing the latter from effecting engagement of said pawl with said ratchet wheel when the fluid pressure developed by said hydraulic pump is above a predetermined minimum pressure corresponding to a predetermined minimum speed of the output shaft.

9. In a transmission housing having an output shaft disposed lengthwise therein and a hydraulic pump driven by said output shaft, the combination of lockup means for said output shaft for selectively braking the latter comprising, a ratchet wheel keyed to said output shaft, a pawl pivoted adjacent its one end to said transmission housing at a point above a horizontal plane passing through the axis of said output shaft and at its other end being adapted to engage said ratchet wheel at a point above the horizontal plane passing through the axis of said output shaft for holding said ratchet wheel against rotation, a crank arm pivotally mounted at its one end to said transmission housing, a stub link between the other ends of said crank arm and said pawl, a generally vertically extending link member having connection at its one end to said crank arm intermediate of the ends thereof, manually operable means connected to the other end of said link member for effecting movement thereof and of said pawl into engagement with said ratchet wheel, a plunger member cooperating with the other end of said link member, said plunger member being normally spring biased away from said link member to permit free movement of the latter, a fluid connection between said plunger member and said hydraulic pump, fluid therein for overcoming said biasing force of said spring associated with said plunger member whereby said plunger member is disposed adjacent to and immediately below said link member for limiting movement of the latter and preventing engagement of said pawl with said ratchet wheel when the fluid pressure developed by said hydraulic pump is above a predetermined minimum pressure corresponding to a predetermined minimum speed of the output shaft.

10. In an automobile transmission parking lockup, a variable speed transmission shaft, a first locking member connected to said shaft, a second locking member movable into and out of engagement with said first member and in cooperation therewith locking said shaft against rotation in either direction when said second member is engaged with said first member, and governor means associated with and responsive to the speed of rotation of said shaft effective for preventing said second member from engaging said first member when the speed of rotation of said shaft exceeds a predetermined minimum.

11. In an automobile transmission parking lockup, a variable speed transmission shaft, two cooperating engageable and disengageable locking members one of which is connected to said shaft for rotation therewith, said members when engaged being effective to lock said shaft against rotation in either direction while permitting rotation thereof when disengaged, governor means associated with and responsive to the speed of rotation of said shaft, and a movable member controlled by said governor means effective for maintaining said locking members disengaged when the speed of rotation of said shaft exceeds a predetermined minimum while permitting engagement of said locking members when the speed of rotation of said shaft is within said minimum.

12. In an automobile transmission parking lockup, a variable speed transmission shaft, a rotating toothed locking member having positive connection to and driven by said shaft, a locking pawl movable into and out of engagement with said member for preventing rotation thereof in either direction, means for manually operating said pawl, and governor means responsive to the speed of rotation of said shaft, and a movable member controlled by said governor means effective for preventing said locking pawl from engaging said locking member when the speed of rotation of said shaft exceeds a predetermined minimum.

13. In an automobile transmission parking lockup, a variable speed transmission shaft, a toothed locking member fixed on said shaft, a locking pawl movable into and out of engagement with said member for preventing rotation thereof in either direction, means for manually operating said pawl, governor means responsive to the speed of rotation of said shaft, and a movable member controlled by said governor means for preventing said locking pawl from engaging said locking member when the speed of rotation of said shaft exceeds a predetermined minimum.

14. In an automobile transmission parking lockup, a variable speed transmission shaft, a toothed locking member fixed on said shaft, a locking pawl movable into and out of engagement with said member, means for manually operating said pawl, safety means comprising a fluid pump driven from said shaft and a member urged by pressure from said pump toward an operative position effective for disabling said operating means and yieldingly urged in opposition to pump pressure toward an inoperative position effective for enabling said operating means.

15. In a vehicle having a transmission with an output shaft and a manually operable shift lever adapted to be positioned in a park position, the combination of brake means for braking said output shaft, means between said shift lever and said brake means adapted upon positioning of said shift lever to park position for applying said brake means, and governor means for preventing applying of said brake means upon positioning of said lever to park position above a predetermined speed of said vehicle.

16. The device of claim 9 wherein the upper edge of each tooth of said ratchet wheel is formed substantially the entire width thereof at an angle of less than 12° with respect to a plane extending transversely of a radial line passing through the center of the tooth and the sides of each tooth on the ratchet wheel and pawl are formed at an angle of less than 12° with respect to a radial line passing through the center of the tooth.

17. In a vehicle including a transmission having an output shaft, the combination of lockup means for said output shaft for selectively braking the latter against rotation in either direction comprising, a ratchet wheel keyed to said output shaft, a pawl adapted to engage said ratchet wheel for holding the latter against rotation in either direction, and governor means for preventing said pawl from engaging said ratchet wheel when the speed of said vehicle is above a predetermined minimum.

18. In an automobile transmission parking lockup, a variable speed transmission shaft, a rotating toothed locking member having positive connection to and driven by said shaft, a locking pawl movable into and out of engagement with said member and operable when engaged with the latter to prevent rotation of the same in either direction, manual shift means for operating said pawl, governor means responsive to the speed of rotation of said shaft and a movable member controlled by said governor means effective for preventing said locking pawl from engaging said locking member after said last-named means has been disposed in an operable position when the speed of rotation of said shaft exceeds a predetermined minimum.

19. In an automobile transmission parking lockup, a variable speed transmission shaft, a toothed locking member fixed on said shaft, a locking pawl movable into and out of engagement with said member and operable when engaged with the latter to prevent rotation of the same in either direction, means for manually operating said pawl, and governor means responsive to the speed of rotation of said shaft for preventing said locking pawl from engaging said locking member after said last named means has been disposed in an operable position when the speed of rotation of said shaft exceeds a predetermined minimum.

WOODROW A. HASBANY.

References Cited in the file of this patent

UNITED STATES PATENTS

| Number | Name | Date |
| --- | --- | --- |
| 1,203,876 | Hornor | Nov. 7, 1916 |
| 1,553,729 | Stevens | Sept. 15, 1925 |
| 1,669,738 | Christianson | May 15, 1928 |
| 1,735,332 | Mikesh | Nov. 12, 1929 |
| 1,834,448 | Ellis | Dec. 1, 1931 |
| 1,848,761 | Wilson et al. | Mar. 8, 1932 |
| 1,900,025 | Porter | Mar. 7, 1933 |
| 1,963,104 | Shinkle | June 19, 1934 |
| 2,002,857 | Jameson | May 28, 1935 |
| 2,345,203 | La Via | Mar. 28, 1944 |